(12) United States Patent
Choi et al.

(10) Patent No.: US 9,168,843 B2
(45) Date of Patent: Oct. 27, 2015

(54) APPARATUS AND METHOD FOR CHARGING BATTERY

(71) Applicant: Hyundai Motor Company, Seoul (KR)

(72) Inventors: Sung-Hoon Choi, Gyeonggi-do (KR); Man-Jae Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/254,321

(22) Filed: Apr. 16, 2014

(65) Prior Publication Data

US 2015/0134164 A1 May 14, 2015

(30) Foreign Application Priority Data

Nov. 11, 2013 (KR) .................. 10-2013-0136076

(51) Int. Cl.
*B60W 10/24* (2006.01)
*B60L 11/18* (2006.01)

(52) U.S. Cl.
CPC ......... *B60L 11/1861* (2013.01); *B60L 11/1816* (2013.01)

(58) Field of Classification Search
None
See application file for complete search history.

(56) References Cited

U.S. PATENT DOCUMENTS

| | | | |
|---|---|---|---|
| 6,449,537 B1 * | 9/2002 | Phillips et al. | 701/22 |
| 6,941,197 B1 * | 9/2005 | Murakami et al. | 701/22 |
| 6,975,997 B1 * | 12/2005 | Murakami et al. | 705/5 |
| 7,849,944 B2 * | 12/2010 | DeVault | 180/65.29 |
| 8,502,498 B2 * | 8/2013 | Fecher | 320/109 |
| 2008/0125928 A1 * | 5/2008 | Conlon et al. | 701/22 |
| 2010/0065357 A1 * | 3/2010 | Oyama et al. | 180/65.265 |
| 2010/0131164 A1 * | 5/2010 | Carter et al. | 701/61 |
| 2010/0318250 A1 * | 12/2010 | Mitsutani | 701/22 |
| 2011/0166732 A1 * | 7/2011 | Yu et al. | 701/22 |
| 2011/0224868 A1 * | 9/2011 | Collings et al. | 701/35 |
| 2012/0200257 A1 | 8/2012 | Schwarz et al. | |
| 2012/0203414 A1 * | 8/2012 | Akutsu et al. | 701/22 |
| 2012/0296505 A1 * | 11/2012 | Igarashi et al. | 701/22 |
| 2012/0316717 A1 * | 12/2012 | Daum et al. | 701/22 |
| 2013/0009765 A1 * | 1/2013 | Gilman et al. | 340/455 |
| 2013/0035812 A1 * | 2/2013 | Bernard | 701/22 |
| 2013/0066495 A1 * | 3/2013 | Furuta | 701/22 |
| 2013/0179007 A1 * | 7/2013 | Dalum | 701/2 |
| 2013/0204471 A1 * | 8/2013 | O'Connell et al. | 701/22 |
| 2013/0231818 A1 * | 9/2013 | Saito | 701/22 |
| 2013/0274982 A1 * | 10/2013 | Tagami | 701/22 |
| 2014/0012447 A1 * | 1/2014 | Gao et al. | 701/22 |
| 2014/0067175 A1 * | 3/2014 | Cho et al. | 701/22 |

(Continued)

FOREIGN PATENT DOCUMENTS

| | | | |
|---|---|---|---|
| JP | 2008199860 A | 8/2008 | |
| JP | 2009-248822 A | 10/2009 | |

(Continued)

*Primary Examiner* — Thomas Tarcza
*Assistant Examiner* — Richard Goldman
(74) *Attorney, Agent, or Firm* — Mintz Levin Cohn Ferris Glovsky and Popeo, P.C.; Peter F. Corless (57) ABSTRACT

An apparatus and method for charging a battery are provided. The apparatus includes a controller that is configured to select a driving mode based on a user operation. In addition, a BMS (Battery Management System) is configured to execute a charge type based on the selected driving mode and charge the battery.

20 Claims, 7 Drawing Sheets

(56) References Cited

U.S. PATENT DOCUMENTS

| | | | |
|---|---|---|---|
| 2014/0081490 A1* | 3/2014 | Adelman | 701/22 |
| 2014/0121866 A1* | 5/2014 | Dangler et al. | 701/22 |
| 2014/0163789 A1* | 6/2014 | Yu et al. | 701/22 |
| 2014/0172206 A1* | 6/2014 | Roos et al. | 701/22 |
| 2014/0207318 A1* | 7/2014 | Sisk et al. | 701/22 |
| 2014/0229043 A1* | 8/2014 | Frank et al. | 701/22 |
| 2014/0303819 A1* | 10/2014 | Aoki et al. | 701/22 |
| 2014/0350764 A1* | 11/2014 | Arai et al. | 701/22 |
| 2015/0019060 A1* | 1/2015 | Suzuki | 701/22 |
| 2015/0039169 A1* | 2/2015 | Dextreit | 701/22 |
| 2015/0134164 A1* | 5/2015 | Choi et al. | 701/22 |

FOREIGN PATENT DOCUMENTS

| | | |
|---|---|---|
| JP | 2012524696 A | 10/2012 |
| KR | 10-2003-0069785 | 8/2003 |
| KR | 10-1091664 | 12/2011 |
| KR | 10-2012-0012522 A | 2/2012 |
| KR | 10-2012-0062332 | 6/2012 |
| KR | 10-2013-0120231 A | 11/2013 |
| KR | 10-2013-0120232 A | 11/2013 |

* cited by examiner

APPARATUS AND METHOD FOR CHARGING BATTERY

CROSS-REFERENCE TO RELATED APPLICATION

This application claims priority to Korean Patent Application No. 10-2013-0136076 filed on Nov. 11, 2013, the entire contents of which are incorporated herein by reference.

TECHNICAL FIELD

The present invention relates to a battery technology; and, particularly, to an apparatus and a method for charging a battery that allows a user to selectively change a charge area of an electric vehicle to improve durability of a battery of the electric vehicle for each user.

BACKGROUND

Figure 1:
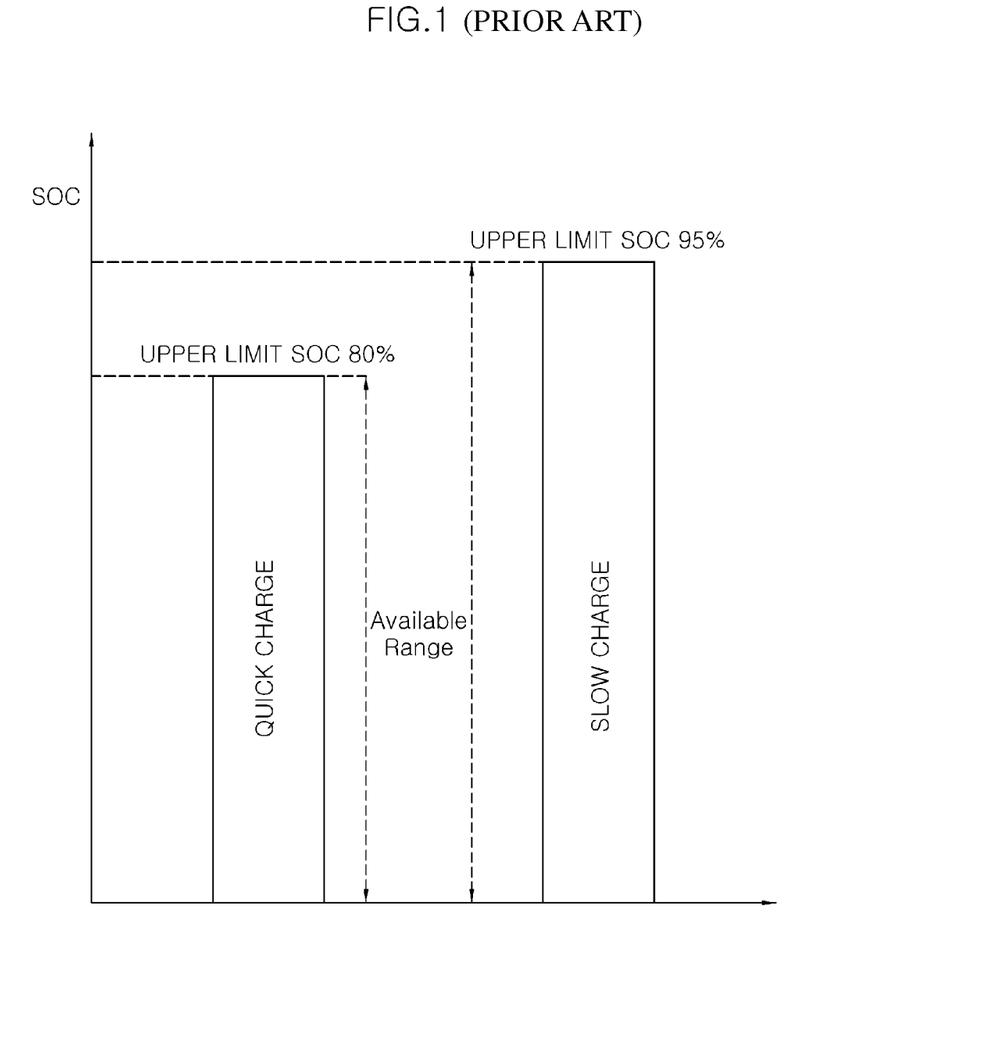
FIG. 1 is an exemplary graph illustrating characteristics charging a typical electric vehicle according to the related art.
Figure 2:
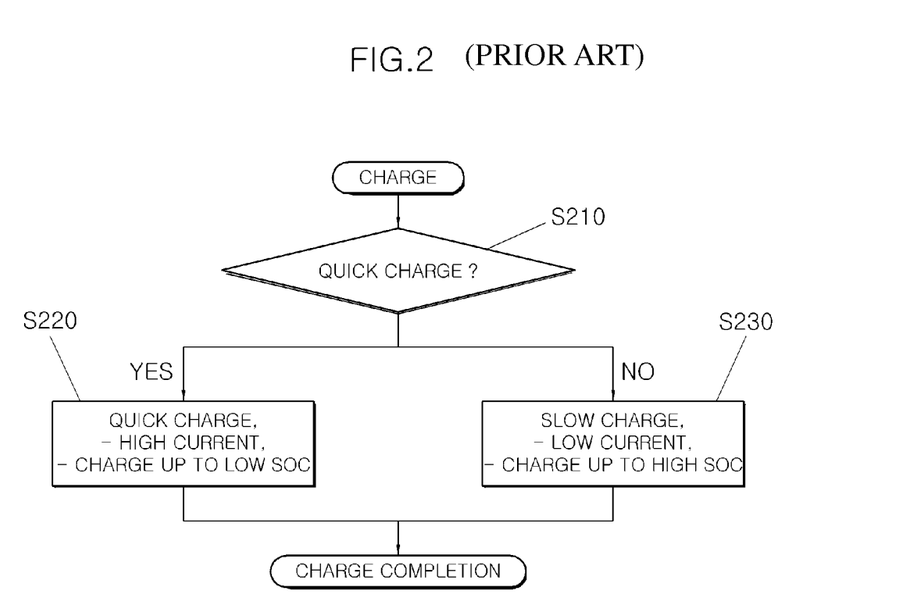
FIG. 2 is an exemplary flowchart illustrating a charge process of the typical electric vehicle according to the related art.

One of the main concerns of the automobile companies is the development of an eco-friendly vehicle. Recently, automobile companies have been developing a variety of eco-friendly vehicles to conform to user demands and government regulations, and the most noteworthy eco-friendly vehicle is an electric vehicle. The chief obstacle in the development of the electric vehicle depends upon whether new system components maintain durability in the environmental conditions of the vehicle. An example of such system components includes a high-voltage battery for charging. Degradation in durability for each charge condition of such a high-voltage battery may be a problem. FIGS. 1 and 2 show a use range of SOC (State of Charge) and a charge process of the high-voltage battery in the electric vehicle.

The following Table 1 indicates an available range of SOC, a size of charge current, and a drivable distance based on a charging method of the electric vehicle with reference to the graph shown in FIG. 1.

TABLE 1

| Charging method | Available range of SOC | Size of Charge current | Drivable distance |
| --- | --- | --- | --- |
| Slow charge | ~95% | Low | Large |
| Quick charge | ~80% | High | Small |

That is, the vehicle may be charged in a manner of quick charge or slow charge based on ambient charge environments. The quick charge may perform charge at substantially high current for a predetermined short time and the slow charge may perform charge at substantially low current for an increased longer predetermined period of time. In other words, the battery may be charged up to high SOC (e.g., SOC about 95%) during the slow charge and may be charged up to low SOC (e.g., SOC about 80%) during the quick charge.

FIG. 2 shows an exemplary diagram understanding of the description. Referring to FIG. 2, whether a quick charge is the current charge may be determined (S210), and in response to determining a quick charge, the battery may be charged up to a substantially low SOC at high current (S220). In addition, in response to determining a slow charge, the battery may be charged up to a substantially high SOC at low current (S230).

However, according to the above-mentioned method, usable energy of the battery may be determined based upon the charging method regardless of a user's intention. In addition, a charge depth (e.g., charge level) of the battery may directly affect durability of the battery. Particularly, a lithium battery applied to the electric vehicle may be vulnerable to degradation as an operational range of upper limit SOC is increased.

SUMMARY

The present invention provides an apparatus and a method for charging a battery that allows a user to directly select an available range of SOC (State of Charge) of a high-voltage battery applied to an electric vehicle using degradation characteristics in durability for each charge condition of the battery to improve durability of the battery.

Other objects and advantages of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with an exemplary embodiment of the present invention, an apparatus for charging a battery may include a controller configured to select a driving mode based on a user operation, a BMS (Battery Management System) configured to execute a charge type based on the selected driving mode, and a battery configured to be charged based on control of the BMS.

The charge type may be a high SOC (State of Charge) charge in which, when the driving mode is not a short-distance driving mode, the charge may be performed up to a predetermined high SOC as a first specific value. The charge type may be low a SOC charge in which, when the driving mode is a short-distance driving mode, the charge may be performed up to a predetermined low SOC as a second specific value. In addition, the high SOC charge may be a slow charge for charging at a predetermined low current or quick charge for charging at a predetermined high current and low current. The low SOC charge may be a slow charge for charging at a predetermined low current or quick charge for charging at a predetermined high current.

The controller may be configured to store a driving distance and/or a charge type for a certain period of time and calculate driving patterns from stored data to calculate optimal SOC. The number of charge or a charge amount based on the charge type may be set by a user. The quick charge may be configured such that charge may be performed at a high current up to low SOC until reaching a predetermined level and may then be performed at a low current up to high SOC with respect to the remaining portion.

In accordance with another exemplary embodiment of the present invention, a method of charging a battery may include selecting, by a controller, a driving mode based on a user operation, executing, by the controller, a charge type based on the selected driving mode, and charging a battery. The method of charging a battery may further include storing, by the controller, a driving distance and/or a charge type for a certain period of time and calculating driving patterns from stored data to calculate optimal SOC.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An apparatus and a method for charging a battery according to exemplary embodiments of the present invention will be described below in more detail with reference to the accompanying drawings. The present invention may, however, be embodied in different forms and should not be construed as limited to the exemplary embodiments set forth herein. Rather, these exemplary embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 3:
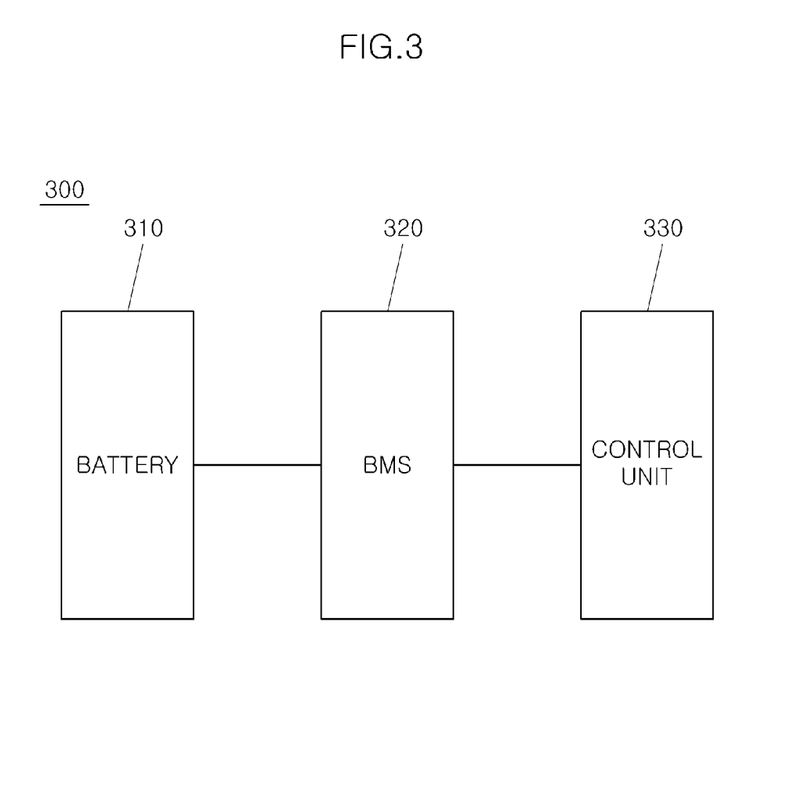
FIG. 3 is an exemplary block diagram illustrating a configuration of a battery charging apparatus according to an exemplary embodiment of the present invention.

FIG. 3 is an exemplary block diagram illustrating a configuration of a battery charging apparatus 300 according to an exemplary embodiment of the present invention. Referring to FIG. 3, the battery charging apparatus 300 may include a controller 330 configured to select a driving mode based on a user operation, a BMS (Battery Management System) 320 configured to execute a charge type based on the selected driving mode, and a battery 310 configured to be charged based on control of the BMS 320.

The battery 310 may include a plurality of battery cells (not shown) arranged in series and/or in parallel, and the battery cells may constitute a battery for an electric vehicle such as a nickel-metal battery or a lithium-ion battery. In particular, an example of the electric vehicle may include an EV (Electric Vehicle), an HEV (Hybrid Electric Vehicle), a PHEV (Plug-in Hybrid Electric Vehicle), a fuel cell vehicle, etc. The BMS 320 may be executed by the controller 330.

Figure 4:
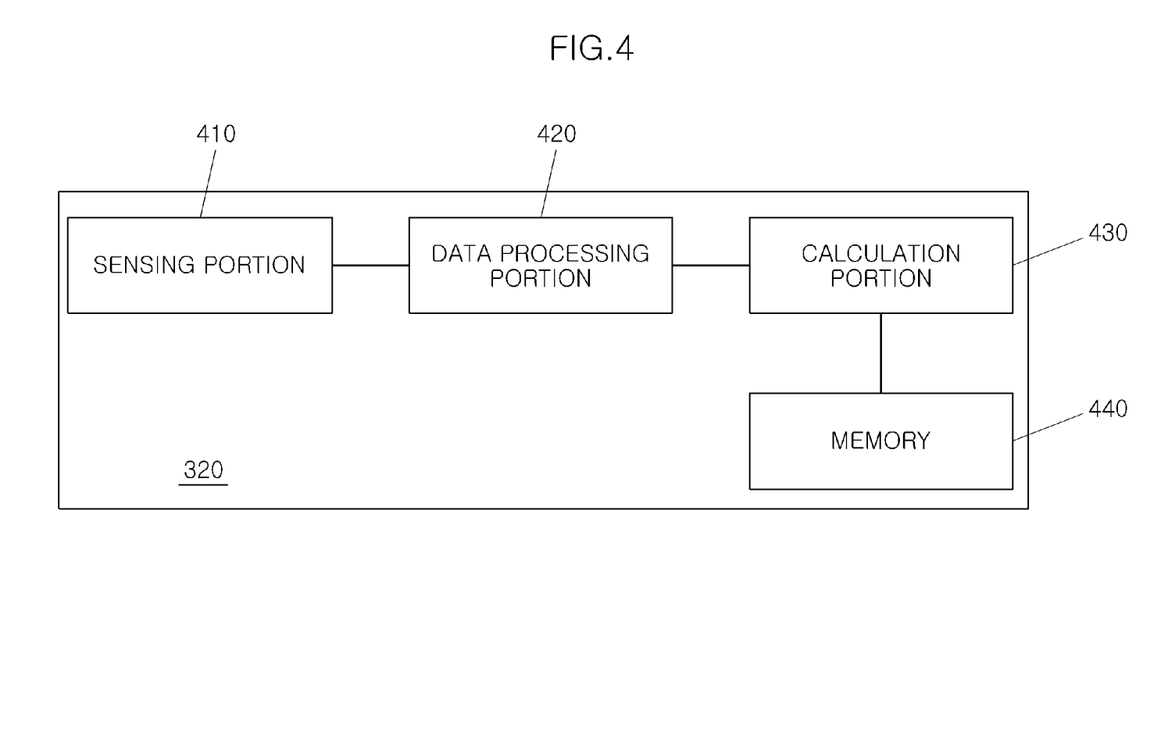
FIG. 4 is an exemplary block diagram illustrating a detail configuration of a BMS (Battery Management System) shown in FIG. 3 according to the related art.

FIG. 4 is an exemplary block diagram illustrating a detail configuration of the BMS (Battery Management System) 320 shown in FIG. 3. Referring to FIG. 4, the BMS 320 may include a sensing portion 410 to sense the battery 310, a data processing portion (e.g., a processor) 420 configured to process a sensing signal generated by the sensing portion 410 to generate data, a calculation portion 430 configured to generate SOC (State of Charge), SOH (State of Health), and the like using the generated data and then transmit the data to the controller 330 or process the data by receiving a control such as a driving mode from the controller 330, a memory 440 configured to store the generated data, algorithm for management of the battery 310, and the like.

The sensing portion 410 may include a current sensor configured to sense the current of the battery 310, a voltage sensor configured to sense voltage of the battery 310, a temperature sensor configured to sense temperature of the battery 310, and the like. The memory 440 may be formed within the BMS 310 or may be a separate memory. Accordingly, the memory 440 may be configured by a combination of a non-volatile memory such as a hard disc drive, a flash memory, an EEPROM (Electrically erasable programmable read-only memory), an SRAM (Static RAM), an FRAM (Ferro-electric RAM), a PRAM (Phase-change RAM), or an MRAM (Magnetic RAM), and/or a volatile memory such as a DRAM (Dynamic Random Access Memory), an SDRAM (Synchronous Dynamic Random Access Memory), or a DDR-SDRAM (Double Date Rate-SDRAM).

Figure 5:
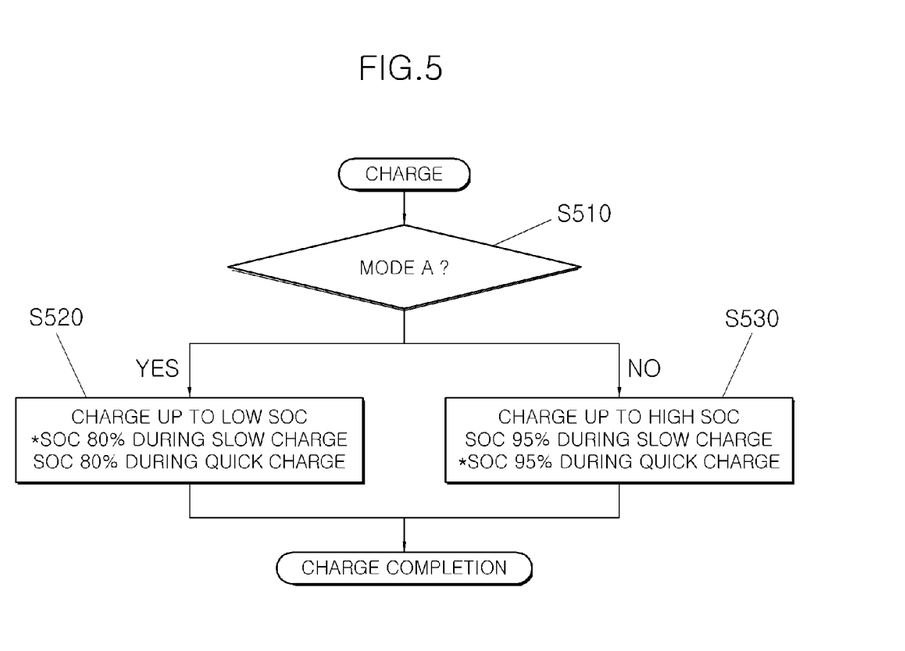
FIG. 5 is an exemplary flowchart illustrating a charge process of a battery considering durability of the battery according to the exemplary embodiment of the present invention.

FIG. 5 is an exemplary flowchart illustrating a charge process of the battery considering durability of the battery according to the exemplary embodiment of the present invention. Referring to FIG. 5, the controller 330 (see FIG. 3) may be configured to select a driving mode based on a user operation (step S510). In other words, when the vehicle enters a charge mode, a type of charge may be determined based on the driving mode. Therefore, a state of the driving mode should be identified.

A "mode A" indicated in FIG. 5 may be assumed as a short-distance driving mode for easy understanding of the present invention. Of course, the present invention is not limited thereto, and may also be applied, for example, to a case of a middle-distance driving mode and/or a long-distance driving mode (e.g., predetermined driving distances wherein the short-distance is a shortest driving distance in comparison to the long-distance). At step S510, when the driving mode is in mode A, low SOC charge may be performed (step S520). In other words, when the mode A as a short-distance driving mode (e.g., a predetermined distance) is selected, the BMS 320 (see FIG. 3) may be configured to execute a low SOC charge. Particularly, the low SOC charge may perform a predetermined slow charge or quick charge. The slow charge may be method in which charge is performed up to a predetermined low SOC (e.g., SOC about 80%) at a predetermined low current. Further, the quick charge may be method in which charge is performed up to high SOC (for example, SOC 95%) at high current.

At step S510, when the charging mode is not in mode A, the vehicle may be charged up to a predetermined high SOC (step S530). In other words, when the driving mode of the vehicle is not mode A, slow charge or quick charge may be executed. In particular, for the quick charge, is the battery may be charged up to a predetermined low SOC at a predetermining high current and then may be charged up to high SOC (e.g., SOC about 95%) at a predetermined low current with respect to the remaining portion. That is, charging may be performed at high current up to SOC of about 80% and may be performed at low current up to SOC at about 95% from SOC 81%.

In addition, in the other exemplary embodiment of the present invention, the above-mentioned step S510 to step S530 may be performed repeatedly and data such as a driving distance and/or a type of charge may be stored for a certain period of time. It may also be possible to analyze driving patterns of a user using the data and calculate an optimal SOC value using the analyzed driving patterns. For example, to the controller may be configured to calculate optimal SOC by calculating the average of driving distances and calculating a driving distance based on the same.

Further, in the other exemplary embodiment of the present invention, a user may directly set a charge amount for charging or may also set a charge type. For example, that the setting may be that SOC 80% is changed to SOC 60% or that charging is performed at high current up to SOC 70% and is then performed at low current. In other words, a user may select a battery charging method based on a driving distance, and thus durability of the battery may be improved within a typical driving practice.

Figure 6:
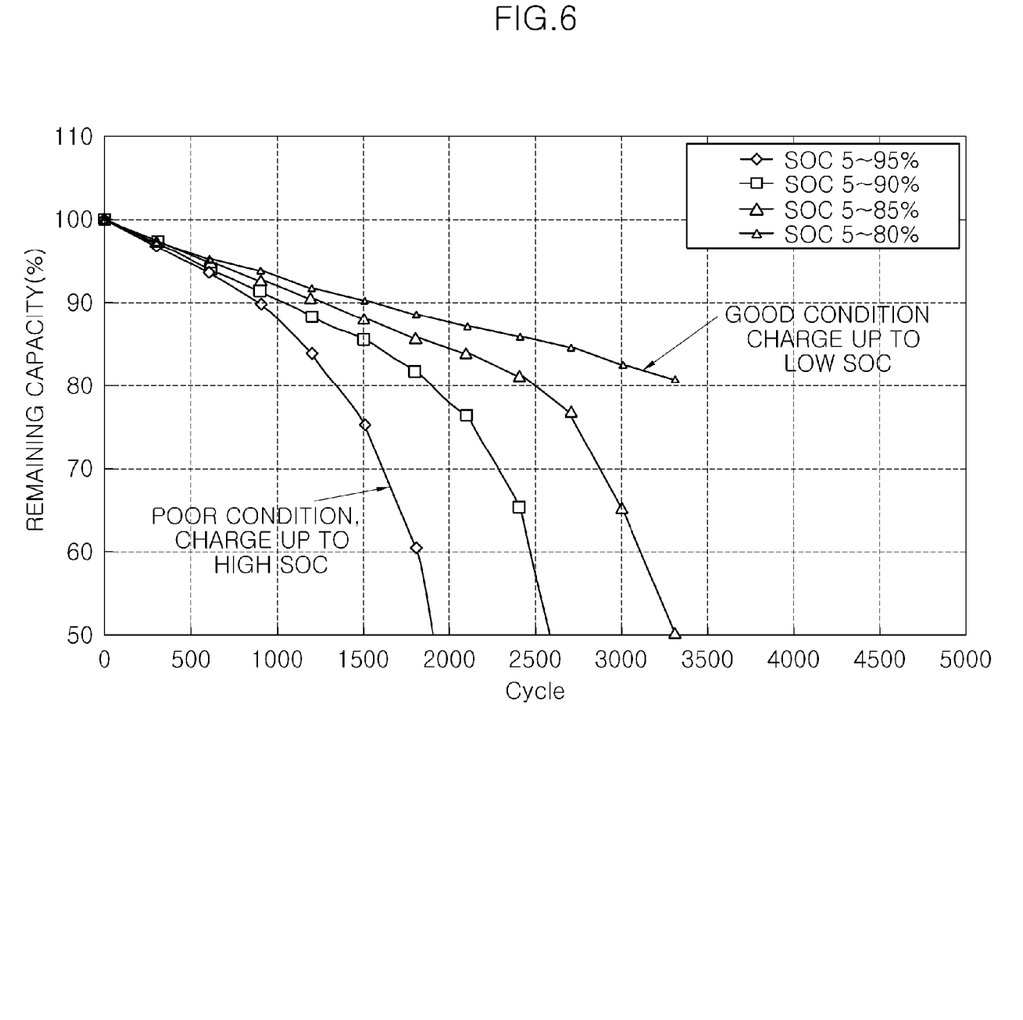
FIG. 6 is an exemplary graph generally illustrating degradation according to a SOC available range of the battery according to an exemplary embodiment of the present invention.

FIG. 6 is an exemplary graph generally illustrating degradation based on a SOC available range of the battery. Referring to FIG. 6, as seen from degradation indices of the battery for the electric vehicle, a remaining capacity of the battery 310 (see FIG. 1) may decrease as the cycle increases. Relative comparison of degradation degrees of the battery according to proceeding of evaluation of durability for each SOC operational area is as follows.

SOC 5~80%: good condition
SOC 5~95%: poor condition

Additionally, the degradation degree may vary based on a charge depth of the battery. In other words, a difference in degradation may be generated based on a charge depth of the battery. Referring to FIG. 6, during charge/use of the battery in a high SOC area, the degradation of the battery may be substantial.

Figure 7:
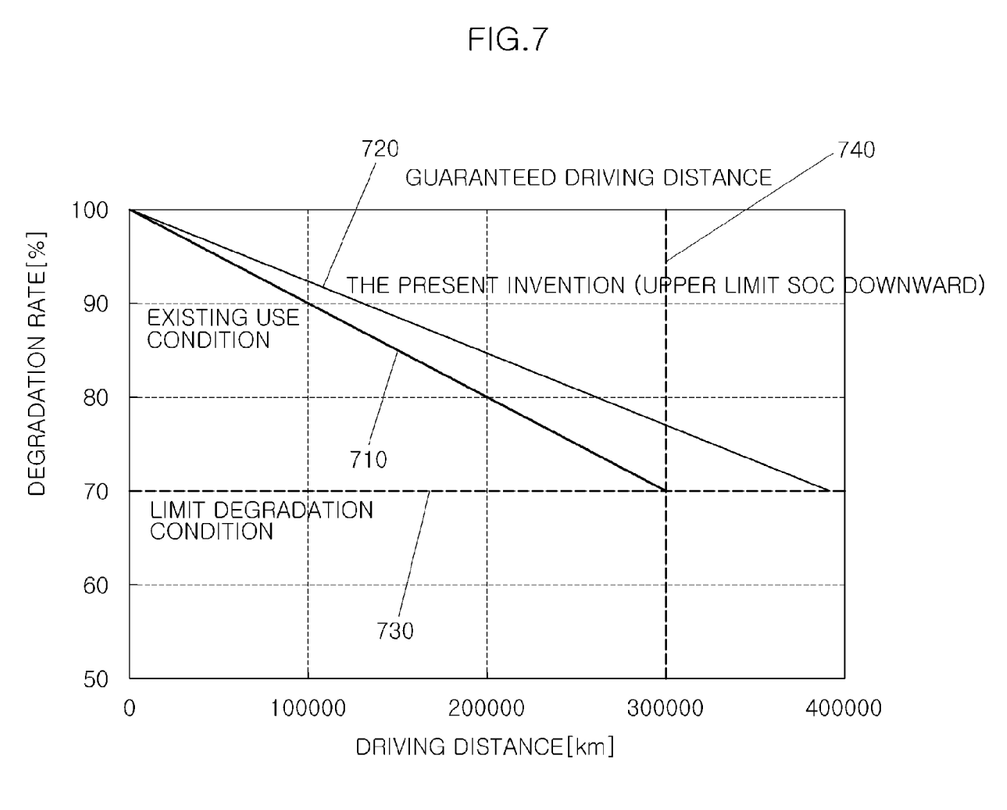
FIG. 7 is an exemplary graph illustrating degradation of the battery based on an increase in driving distance according to the exemplary embodiment of the present invention.

FIG. 7 is an exemplary graph illustrating degradation of the battery based on an increase in driving distance according to the exemplary embodiment of the present invention. Referring to FIG. 7, according to an increase in driving distance, an existing use condition 710 may rapidly reach a limit degradation condition 730 until a guaranteed driving distance 740. On the other hand, using the present invention 720 a threshold at which the battery enters a degraded state (e.g., the limit degradation condition 730) may be reached at a slower pace. In other words, the driving distance may reach the limit degradation condition 730 beyond the guaranteed driving distance 740. In accordance with the exemplary embodiments of the present invention, since one-time driving distance of a typical electric vehicle may not need maximum available energy of a battery, a user of the electric vehicle may adjust a degradation degree of the battery by changing a SOC (State of Charge) area charged according to characteristics (e.g., driving distance) of the user. While the present invention has been described with respect to the exemplary embodiments, it will be apparent to those skilled in the art that various changes and modifications may be made without departing from the spirit and scope of the invention as defined in the following claims.

What is claimed is:

1. An apparatus for charging a battery, comprising:
   a controller configured to select a driving mode based on a user operation;
   a Battery Management System (BMS) configured to execute a charge type based on the selected driving mode; and
   a battery configured to be charged based on a control of the BMS,
   wherein when the driving mode is a short-distance driving mode, the charge is controlled to be performed up to a low state of charge (SOC).

2. The apparatus of claim 1, wherein the charge type is a high SOC charge in which, when the driving mode is not the short-distance driving mode, the charge is performed up to the high SOC, wherein the high SOC is 95% of full SOC.

3. The apparatus of claim 1, wherein the charge type is the low SOC charge in which, when the driving mode is the short-distance driving mode, the charge is performed up to the low SOC, wherein the low SOC is 80% of full SOC.

4. The apparatus of claim 2, wherein the high SOC charge charging with a predetermined low current up to the high SOC at a slow charge or charging with the predetermined high current up to the low SOC until reaching a threshold level and then charging with the predetermined low current up to the high SOC with respect to the remaining portion at a quick charge.

5. The apparatus of claim 1, wherein the low SOC charge is charging with a predetermined low current up to the low SOC at a slow charge or quick charging with predetermined high current up to the low Soc at a quick charge.

6. The apparatus of claim 1, wherein the controller is configured to store a driving distance and a charge type for a period of time and calculate a plurality of driving patterns from the stored data to calculate an optimal SOC.

7. The apparatus of claim 1, wherein a number of a charge or a charge amount based on the charge type is user set.

8. The apparatus of claim 4, wherein the quick charge is performed at the predetermined high current up to the low SOC until reaching a threshold level and is then performed at the predetermined low current up to the high SOC with respect to the remaining portion.

9. A method of charging a battery, comprising:
selecting, by a controller, a driving mode based on a user operation;
executing, by a battery management system (BMS) a charge type based on the selected driving mode; and
charging, by the BMS, the battery,
wherein when the driving mode is a short-distance driving mode, the charge is controlled to be performed up to a low state of charge (SOC).

10. The method of claim 9, wherein the charge type is a high SOC charge in which, when the driving mode is not the short-distance driving mode, the charge is performed up to the high SOC, wherein the high SOC is 95% of full SOC.

11. The method of claim 9, wherein the charge type is a low SOC charge in which, when the driving mode is the short-distance driving mode, the charge is performed up to the low SOC, wherein the low SOC is 80% of full SOC.

12. The method of claim 10, wherein the high SOC charge is charging with a predetermined low current up to the high SOC at a slow charge or charging with the predetermined high current up to the low SOC until reaching a threshold level and then charging with the predetermined low current up to the high SOC with respect to the remaining portion at a quick charge.

13. The method of claim 11, wherein the low SOC charge is charging with a predetermined low current up to the low SOC at a slow charge or charging with a predetermined high current up to the low SOC at a quick charge.

14. The method of claim 9, further comprising:
storing, by the controller, a driving distance and a charge type for a period of time; and
calculating, by the controller, a plurality of driving patterns from the stored data to calculate an optimal SOC.

15. The method of claim 9, wherein a number of a charge or a charge amount based on the charge type is user set.

16. The method of claim 12, wherein the quick charge is performed at the predetermined high current up to the low SOC until reaching a certain threshold and is then performed at the predetermined low current up to the high SOC with respect to the remaining portion.

17. A non-transitory computer readable medium containing program instructions executed by a controller, the computer readable medium comprising:
program instructions that select a driving mode based on a user operation;
program instructions that control a battery management system (BMS) to execute a charge type based on the selected driving mode; and
program instructions that control the BMS to charge the battery,
wherein when the driving mode is a short-distance driving mode, the charge is controlled to be performed up to a low state of charge (SOC).

18. The non-transitory computer readable medium of claim 17, wherein the charge type is a high SOC charge in which, when the driving mode is not the short-distance driving mode, the charge is performed up to the high SOC, wherein the high SOC is 95% of full SOC.

19. The non-transitory computer readable medium of claim 17, wherein the charge type is a low SOC charge in which, when the driving mode is the short-distance driving mode, the charge is performed up to the low SOC, wherein the low SOC is 80% of full SOC.

20. The non-transitory computer readable medium of claim 17, further comprising:
program instructions that store the driving distance and the charge type for a period of time; and
program instructions that calculate a plurality of driving patterns from the stored data to calculate an optimal SOC.

* * * * *